US009131121B2

(12) United States Patent
Matsudo

(10) Patent No.: US 9,131,121 B2
(45) Date of Patent: Sep. 8, 2015

(54) INTRUSION DETECTION DEVICE, ROBOT SYSTEM, INTRUSION DETECTION METHOD, AND INTRUSION DETECTION PROGRAM

(71) Applicant: Seiko Epson Corporation, Tokyo (JP)

(72) Inventor: Tatsuya Matsudo, Showa-cho (JP)

(73) Assignee: Seiko Epson Corporation (JP)

( * ) Notice: Subject to any disclaimer, the term of this patent is extended or adjusted under 35 U.S.C. 154(b) by 185 days.

(21) Appl. No.: 13/897,513

(22) Filed: May 20, 2013

(65) Prior Publication Data

US 2013/0321636 A1  Dec. 5, 2013

(30) Foreign Application Priority Data

May 30, 2012  (JP) ................ 2012-122789

(51) Int. Cl.
| | |
|---|---|
| H04N 7/18 | (2006.01) |
| H04N 5/225 | (2006.01) |
| H04N 17/00 | (2006.01) |
| H04N 17/02 | (2006.01) |
| G06F 19/00 | (2011.01) |
| G05B 15/00 | (2006.01) |
| G05B 19/00 | (2006.01) |
| B25J 9/16 | (2006.01) |
| F16P 3/14 | (2006.01) |
| G01V 8/20 | (2006.01) |

(52) U.S. Cl.
CPC ............ *H04N 7/18* (2013.01); *B25J 9/1674* (2013.01); *F16P 3/142* (2013.01); *G01V 8/20* (2013.01); *G05B 2219/40203* (2013.01)

(58) Field of Classification Search
USPC ........................ 700/244, 245–264
See application file for complete search history.

(56) References Cited

U.S. PATENT DOCUMENTS

| | | | | |
|---|---|---|---|---|
| 5,198,661 | A * | 3/1993 | Anderson et al. | 250/221 |
| 6,778,092 | B2 * | 8/2004 | Braune | 340/679 |
| 6,958,465 | B2 | 10/2005 | Haberer et al. | |
| 7,164,116 | B2 | 1/2007 | Akagi | |
| 8,107,058 | B2 * | 1/2012 | Stein et al. | 356/27 |
| 8,214,072 | B2 * | 7/2012 | Hoesel | 700/143 |
| 8,761,921 | B2 * | 6/2014 | Kasuga et al. | 700/194 |
| 2003/0076224 | A1 * | 4/2003 | Braune | 340/500 |

(Continued)

FOREIGN PATENT DOCUMENTS

| | | | |
|---|---|---|---|
| DE | 10 2010 002 250 A1 | 8/2011 | |
| EP | 2 224 266 A2 * | 9/2010 | ............... G01V 1/16 |

(Continued)

OTHER PUBLICATIONS

Extended European Search Report for Application No. EP 13 16 9457 dated Apr. 7, 2015 (7 pages).

*Primary Examiner* — Hung Dang
(74) *Attorney, Agent, or Firm* — Harness, Dickey & Pierce, P.L.C.

(57) ABSTRACT

An intrusion detection device includes: a light emitting unit which forms a plurality of light emitting marks arranged on a boundary of an intrusion monitoring area; an imaging device which images an area including the plurality of light emitting marks, and outputs the captured image; and a detection unit which detects predetermined marks which are different from the light emitting marks, from the output image, sets a masking area on the image based on the detected marks, and detects an intrusion material in the intrusion monitoring area based on the image in an area other than the masking area.

8 Claims, 8 Drawing Sheets

(56) References Cited

U.S. PATENT DOCUMENTS

| | | | |
|---|---|---|---|
| 2003/0174253 A1* | 9/2003 | Ito et al. | 348/699 |
| 2004/0227816 A1 | 11/2004 | Sato et al. | |
| 2008/0021597 A1* | 1/2008 | Merte et al. | 700/255 |
| 2008/0240889 A1* | 10/2008 | Yokoyama | 414/1 |
| 2009/0058642 A1 | 3/2009 | Fukumura | |
| 2009/0254218 A1* | 10/2009 | Sandin et al. | 700/258 |
| 2012/0022689 A1* | 1/2012 | Kapoor | 700/255 |
| 2012/0074296 A1* | 3/2012 | Hammes et al. | 250/205 |
| 2012/0182419 A1* | 7/2012 | Wietfeld | 348/137 |
| 2012/0293625 A1* | 11/2012 | Schneider et al. | 348/46 |
| 2012/0327190 A1 | 12/2012 | Massanell et al. | |

FOREIGN PATENT DOCUMENTS

| | | |
|---|---|---|
| EP | 2224266 A2 | 9/2010 |
| JP | 2003-272061 A | 9/2003 |
| JP | 2004-005542 A | 1/2004 |
| JP | 2004-276154 A | 10/2004 |
| JP | 2010-015258 A | 1/2010 |
| JP | 2010-133503 A | 6/2010 |
| JP | 2010-271713 A | 12/2010 |
| JP | 2013-073563 | 4/2013 |

* cited by examiner

INTRUSION DETECTION DEVICE, ROBOT SYSTEM, INTRUSION DETECTION METHOD, AND INTRUSION DETECTION PROGRAM

BACKGROUND

1. Technical Field

The present invention relates to an intrusion detection device, a robot system, an intrusion detection method, and an intrusion detection program.

2. Related Art

In the related art, a technology of detecting a worker or a foreign material that intrudes into a working area of a robot for an industry using light curtains, to stop a robot or to give a warning with sound or light, in a case where a worker or a foreign material intrudes into a robot across the light curtains has been known. However, production efficiency is degraded, if the robot is stopped or a warning is given, due to an intrusion, every time a worker who loads a workpiece onto a wagon or the like to transport to the robot intrudes, for example. JP-A-2004-5542 discloses a technology capable of determining whether or not a light path of light curtains is cut off by a moving body which is permitted for intrusion, by registering a shape of the moving body such as a wagon which is previously permitted for intrusion to the light curtains. According to the technology disclosed in JP-A-2004-5542, when the light path of light curtains is cut off by the moving body which is permitted for intrusion, a robot can continue operating without being stopped.

However, according to the technology disclosed in JP-A-2004-5542, since it is necessary to previously register a shape or an intrusion path of a moving body such as a wagon or the like to light curtains, it is difficult to be used, in a situation where various workpieces are delivered to a robot by various tools such as wagons or trays having different shapes.

SUMMARY

An advantage of some aspects of the invention is to provide an intrusion detection device which can easily provide an exception of detecting function with respect to intrusion to a target area, a robot, an intrusion detection method, and an intrusion detection program.

(1) An aspect of the invention is directed to an intrusion detection device including: a light emitting unit which forms a plurality of light emitting marks arranged on a boundary of an intrusion monitoring area; an imaging device which images an area including the plurality of light emitting marks, and outputs the captured image; and a detection unit which detects predetermined marks which are different from the light emitting marks, from the output image, sets a masking area on the image based on the detected marks, and detects intrusion material in the intrusion monitoring area based on the image in an area other than the masking area.

According to the aspect of the invention, by attaching the predetermined marks to a moving body, it is possible to temporarily invalidate detection of intrusion in the masking area which has the marks as a reference. For example, it is possible to deliver a workpiece to a robot without giving a warning or stopping the robot. Accordingly, according to the aspect of the invention, it is possible to easily provide an exception to the warning or stopping with respect to intrusion to the intrusion monitoring area where the robot or the like is installed. In addition, the light emitting mark in the specification is a constituent element which emits or reflects light and can control light intensity to be emitted or reflected by turning on and off a light source, releasing and cutting off a light path, or changing a reflection rate of a reflector. In addition, the mark is a constituent element which can optically recognize color, a light source, a reflector, a seal, or the like. Further, the intrusion material in the specification is not limited to an object, and is used with a person.

(2) The intrusion detection device may further include a moving body to which the predetermined marks are attached and which is permitted to intrude the intrusion monitoring area.

With this configuration, by loading a workpiece on a moving body to which the marks are attached, it is possible to deliver a workpiece to a robot without attaching marks to a workpiece.

(3) In the intrusion detection device, the marks may be a figure to specify a location and direction.

With this configuration, it is possible to set an anisotropic masking region with the marks as reference.

(4) In the intrusion detection device, the detection unit may detect the mark and the plurality of light emitting marks from the image, and detect the intrusion material based on the light emitting mark detected from an area other than the masking area.

(5) Another aspect of the invention is directed to a robot system including: movable components which manipulate a workpiece; a light emitting unit which forms a plurality of light emitting marks arranged on a boundary of an intrusion monitoring area including the movable components; an imaging device which images an area including the plurality of light emitting marks, and outputs the captured image; and a detection unit which detects predetermined marks which are different from the light emitting marks, from the output image, sets a masking area on the image based on the detected marks, and detects an intrusion material in the intrusion monitoring area based on the image in an area other than the masking area.

When using this configuration, only by attaching the predetermined marks to a moving body, it is possible to temporarily invalidate the detection of intrusion to a robot in the masking area having the marks as reference. For example, it is possible to deliver a workpiece to a robot without giving a warning or stopping the robot.

In addition, the order of operations disclosed in the aspects of the invention is not limited as disclosed above, and the operations may be executed at the same time, may be executed in the reverse order, or may be executed in a continuous order, as long as there is no technical hindrance. In addition, the aspects of the invention are also realized as an intrusion detection method, an intrusion detection program, and a recording medium on which the program is recorded. Of course, the recording medium of a computer program thereof may be a magnetic recording medium, may be a magneto-optic recording medium, or may be any recording medium to be developed later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
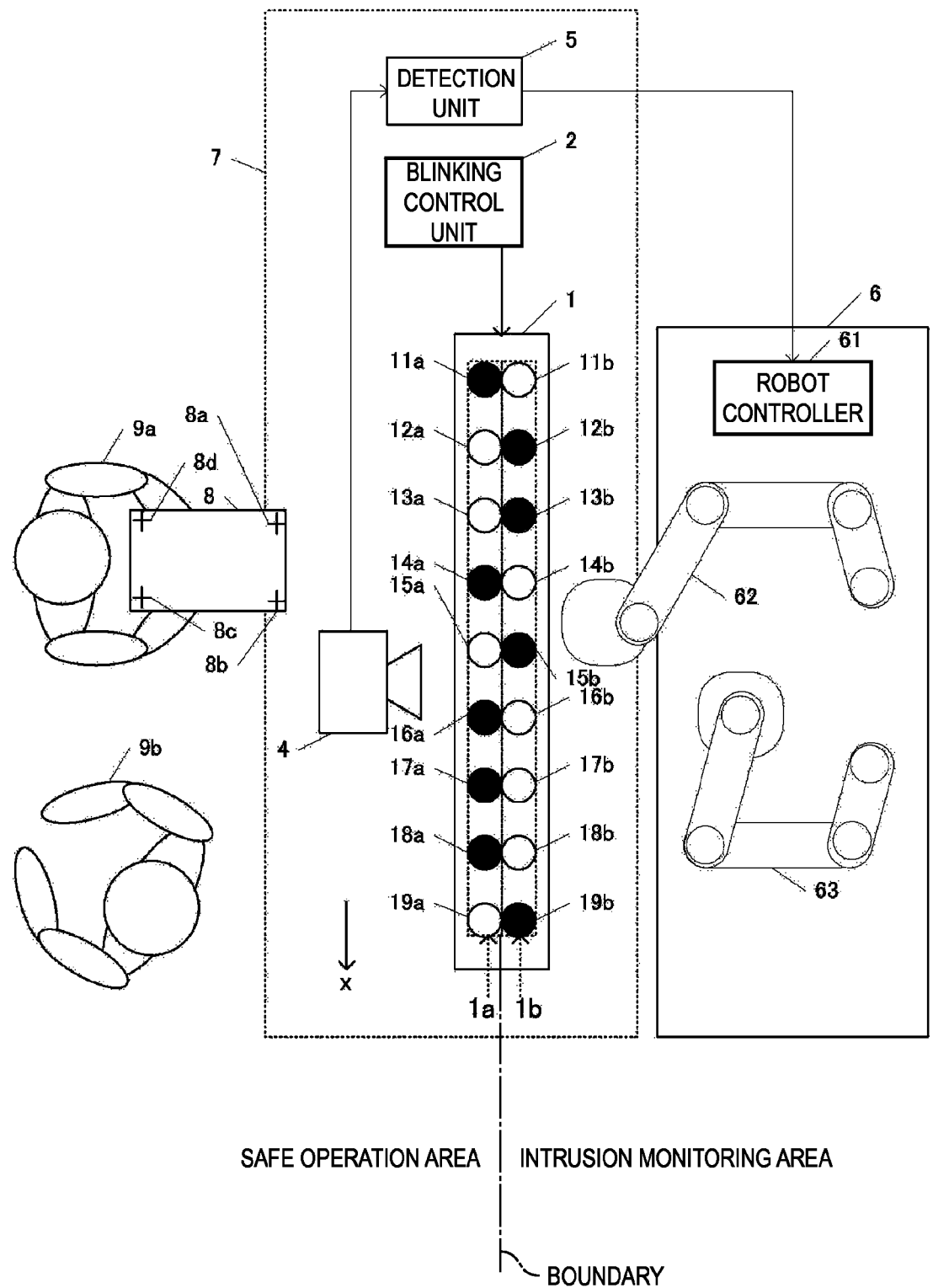
FIG. 1 is a block diagram according to an embodiment of the invention.

Hereinafter, embodiments of the invention will be described based on examples with reference to the accompanied drawings. In addition, same reference numerals are given for corresponding constituent elements in each drawing, and overlapping descriptions are omitted.

1. First Embodiment

FIG. 1 shows the entire configuration of a first embodiment of the invention. The first embodiment of the invention is an industrial robot system including a robot main body 6, and an intrusion detection device 7 for detecting intrusion when workers 9a and 9b intrude into an intrusion monitoring area where the robot main body 6 is installed, from a safe area.

The robot main body 6 includes a robot controller 61, arms 62 and 63 as movable components which manipulate a workpiece. The control systems of the robot main body 6 and the intrusion detection device 7 are set to be independent, and the robot controller 61 of the robot main body 6 and a detection unit 5 of the intrusion detection device 7 are connected to each other by a communication line. The robot main body 6 is configured so as to be operated cooperatively with the workers 9a and 9b. For example, when the intrusion detection device 7 detects intrusion, the robot controller 61 starts a predetermined processes, such as stopping an actuator of arms 62 and 63, generating an alarm sound, or turning on a warning light. The functions of the robot controller 61 are realized by a computer which controls the entire robot main body 6 and a computer program executed by the computer.

The intrusion detection device 7 includes a light emitting unit 1 including a plurality of LEDs (Light Emitting Diode) which functions as light emitting marks, a blinking control unit 2 which controls light emitting of the LEDs, a digital camera 4 as an image device which is installed so as to include the light emitting unit 1 in a view, a detection unit 5 which detects intrusion based on an image configured by image data output by the digital camera 4, and a tray 8 as a moving body. The blinking control unit 2 and the detection unit 5 are configured with separated computers, respectively. The blinking control unit 2 and the light emitting unit 1 are set to be an integrated unit, the digital camera 4 and the detection unit 5 are set to be another integrated unit, and these two units are installed on both ends of a boundary where intrusion is detected.

The tray 8 is used for the worker 9a and 9b to deliver a workpiece to the robot main body 6 without stopping the robot main body 6. By attaching predetermined masking marks 8a, 8b, 8c, and 8d to the tray 8, it is possible to register the tray 8 as a moving body which is permitted to intrude into the intrusion monitoring area from the safe operation area. The masking marks 8a, 8b, 8c, and 8d are optically recognized, and are only necessary to be discriminated from the LEDs of the light emitting unit 1. The masking marks may be configured by a seal of a specific color and shape, a light source which emits a specific color, color of a specific color and shape, a barcode having specific information, or the like, but in the example, are set to be cross seals with a predetermined dimension as shown in FIG. 1. The tray 8 has a rectangular loading surface for loading a workpiece. By attaching the masking marks 8a, 8b, 8c, and 8d to corners of the loading surface, it is possible for the workers 9a and 9b to deliver a workpiece loaded on a loading surface to the robot main body 6 without stopping the robot main body 6.

The light emitting unit 1 is installed along the boundary of the safe operation area of the workers 9a and 9b and the intrusion monitoring area. The light emitting unit 1 includes a first light emitting mark row 1a formed of LEDs 11a to 19a which are arranged in the safe operation area partitioned by the boundary, to be adjacent to the boundary along the boundary, a second light emitting mark row 1b formed of LEDs 11b to 19b which are arranged in the intrusion monitoring area partitioned by the boundary, to form approximately one-to-one pairs with the first light emitting mark row along the boundary, and a driving circuit (not shown) which drives the LEDs 11a, 12a, 13a, 14a, 15a, 16a, 17a, 18a, 19a, 11b, 12b, 13b, 14b, 15b, 16b, 17b, 18b, and 19b. A control signal generated by the blinking control unit 2 is applied to the driving circuit. One LED belonging to the first light emitting mark row 1a and one LED belonging to the second light emitting mark row 1b which faces the one LED with the boundary interposed therebetween, form a pair as a control target of the blinking control unit 2. For example, the LED 11a and the LED 11b, and the LED 12a and the LED 12b form pairs, respectively. Here, a pair of the LED 11a and the LED 11b is set as a pair 11, and a pair of the LED 12a and the LED 12b is set as a pair 12.

The digital camera 4 includes an area image sensor (not shown). The area image sensor is configured by a CCD image sensor, a CMOS image sensor, or the like, and can image all LEDs 11a, 12a, 13a, 14a, 15a, 16a, 17a, 18a, 19a, 11b, 12b, 13b, 14b, 15b 16b, 17b 18b, and 19b which are imaged by a lens (not shown). Image timing of each frame in the digital camera 4 is controlled in a period for accumulating a charge in a photoelectric conversion element of the image sensor for the digital camera 4 to generate image data configuring the image of each frame, so that light emitting patterns of the LEDs 11 to 19 do not change.

In respective pairs 11 to 19 of the LEDs, when turning on the light of one LED in a pair, the blinking control unit 2 and the driving circuit of the light emitting unit 1 turn off the light of the other LED in a pair. Although it is the time at which one LED in a pair of the LEDs is not emitting light, since the other LED is emitting light, if intrusion in the intrusion monitoring area from the safe operation area occurs, the light path from any one of the LED pairs to the digital camera 4 is certainly cut off. Accordingly, it is possible to reliably detect intrusion into the intrusion monitoring area beyond the boundary.

Figure 2:
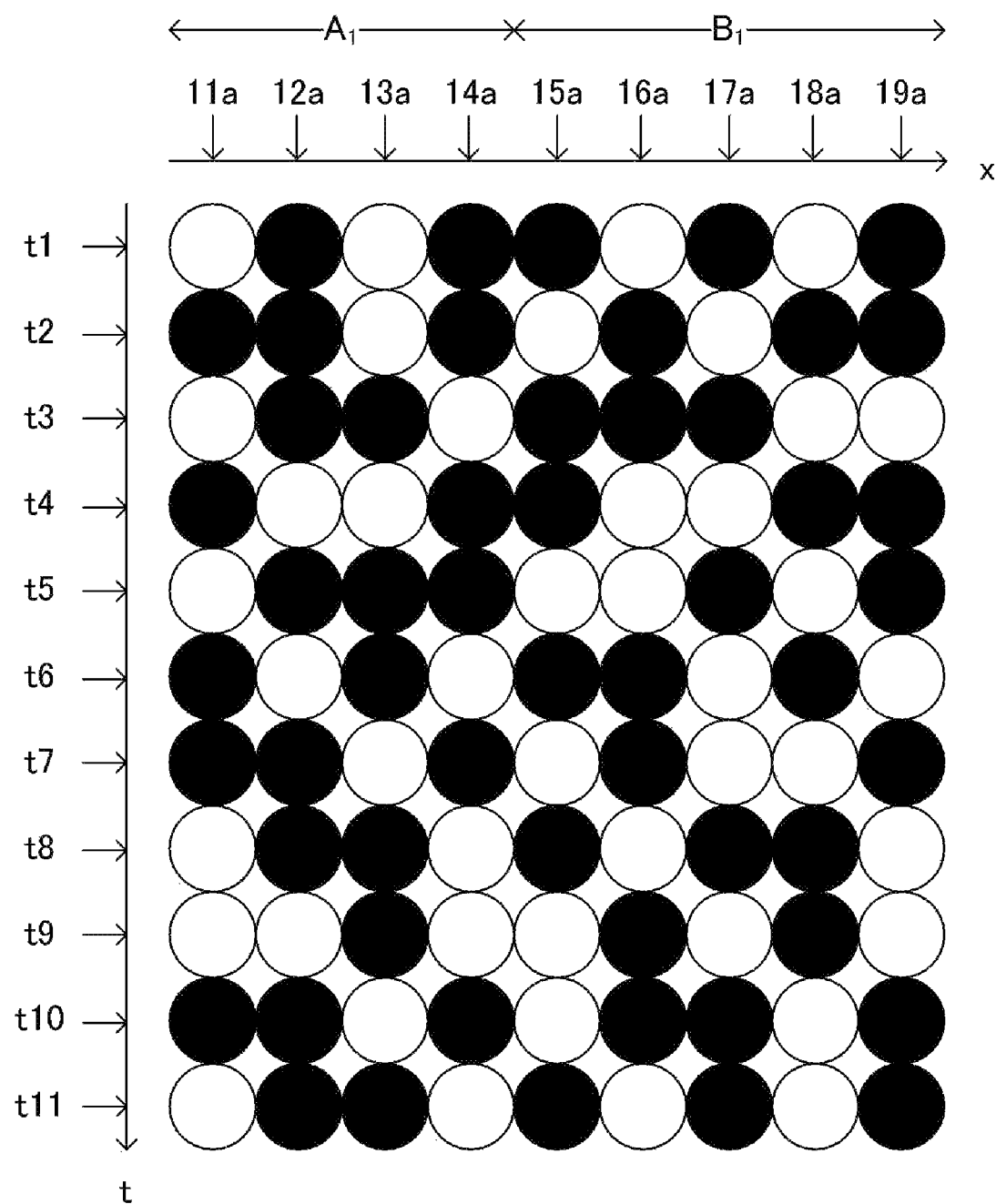
FIG. 2 is a schematic view according to the embodiment of the invention.

FIG. 2 is a schematic view showing an example of light emitting patterns of the LEDs 11a, 12a, 13a, 14a, 15a, 16a, 17a, 18a, and 19a controlled by the blinking control unit 2. In FIG. 2, t shows a time axis. In addition, an x axis which is parallel with the boundary of the safe operation area and the intrusion monitoring area as shown in FIG. 1 is also shown in FIG. 2. Further, in FIG. 2, white circles indicate light turned on, and black circles indicate light turned off. In FIG. 2, the light emitting patterns only for the first light emitting mark row 1a are shown, and the light emitting patterns of the second light emitting mark row 1b are obtained by reversing the light emitting patterns shown in FIG. 4.

First, light emitting patterns of the LEDs at an arbitrary time will be described. For example, at time t1, LEDs 11a, 13a, 16a, and 18a are turned on, and the LEDs 12a, 14a, 15a, 17a, and 19a are turned off. As described above, at the arbitrary timing, it is preferable to include both LEDs 11a, 13a, 16a, and 18a which emit light, and LEDs 12a, 14a, 15a, 17a, and 19a which do not emit light in the first light emitting mark row 1a arranged in an x axis direction along the boundary of the safe operation area and the intrusion monitoring area. In addition, since the light emitting patterns of the first light emitting mark row 1a and the light emitting patterns of the second light emitting mark row 1b are reversed, if the LEDs which emit light and the LEDs which do not emit light are included in the first light emitting mark row 1a, it is needless to say that the LEDs which emit light and the LEDs which do not emit light are also included in the second light emitting mark row 1b. As described above, if the LEDs which emit light and the LEDs which do not emit light are included in a LED group arranged in the x axis direction along the boundary of the safe operation area and the intrusion monitoring area, it is possible to reduce a spatial dead zone at the arbitrary time. For example, at time t1, although a foreign material intrudes only in the light path from the LEDs 12a, 14a, 15a, 17a, and 19a to the digital camera 4, the intrusion of the foreign material cannot be detected since the LEDs are turned off, however, since the LEDs 11a, 13a, 16a, and 18a which belong to the same first light emitting mark row 1a and are adjacent to the LEDs which are turned off, are turned on, it is highly possible to detect the foreign material. Further, since the LEDs 12b, 14b, 15b, 17b, and 19b which form pairs with the LEDs 12a, 14a, 15a, 17a, and 19a which are turned off at the time t1, are also turned on, it is highly possible to detect the foreign material. Of course, when the entire first light emitting mark row 1a which is arranged in the x axis direction along the boundary of the safe operation area and the intrusion monitoring area is turned on, there is no dead zone in the light path from the first light emitting mark row 1a to the digital camera 4. However, since the entire light path from the second light emitting mark row 1b to the digital camera 4 becomes a dead zone, when the entire first light emitting mark row 1a is turned on, the case of including the LEDs which emit light and the LEDs which do not emit light in the LED group arranged in the x axis direction can narrow the dead zone.

Next, light emitting patterns in time series of an arbitrary LED will be described. For example, the LED 11a is turned on at time t1, t3, t5, t8, t9, and t11, and is turned off at time t2, t4, t6, t7, and t10. As described above, by turning on and off the arbitrary LED for each time, it is possible to reduce the dead zone on the time axis. For example, at time t2, although a foreign material intrudes only in the light path from the LEDs 11a to the digital camera 4, the intrusion of the foreign material cannot be detected since the LED 11a is turned off, however, since the LED 11a is turned on at the time t1 and t3 immediately before and after the time t2, it is highly possible to detect the foreign material. Of course, when the LED 11a is turned on at all times, there is no dead zone in the light path from the LED 11a to the digital camera 4. However, when turning on the LED 11a at all times, the light path from the LED 11b which forms a pair with the LED 11a to the digital camera 4 becomes the dead zone at all times. Thus, by turning on and off the arbitrary LED at each time, it is possible to reduce the spatial dead zone.

As described above, it is possible to narrow the dead zone, by mixing the LEDs which emit light and the LEDs which do not emit light in the LED group arranged in the x axis direction along the boundary of the safe operation area and the intrusion monitoring area, and by turning on and off the arbitrary LED at each time. In addition, as described above, by changing the light emitting patterns of the LEDs temporally and spatially, it is possible to prevent intentional intrusion. For example, if the light emitting patterns of the LEDs are set so as not to change temporally, by providing a shield having a copy of the spatial light emitting patterns, between the light emitting unit 1 and the digital camera 4, it is possible to intrude in the intrusion monitoring area from between the shield and the light emitting unit 1 without being detected by the intrusion detection device 7. In addition, for example, if the light emitting patterns of the LEDs are set so as not to change spatially, by providing a shield having a copy of the temporal light emitting patterns, between the light emitting unit 1 and the digital camera 4, it is possible to intrude in the intrusion monitoring area from between the shield and the light emitting unit 1 without being detected by the intrusion detection device 7. However, when the light emitting patterns of the LEDs are set so as to change temporally and also spatially, it is extremely difficult to copy the light emitting patterns of the LEDs, such that intended intrusion is substantially extremely difficult.

Control signals of the LEDs 11a, 12a, 13a, 14a, 15a, 16a, 17a, 18a, 19a, 11b, 12b, 13b, 14b, 15b, 16b, 17b 18b, and 19b, which are generated by the blinking control unit 2, include two states of turning on and turning off for each LED, and are binary data. Here, turning on is set as 1, and turning off is set as 0, and when a portion of the control signals corresponding to the first light emitting mark row 1a by allocating each high-order 1 bit in order of the LEDs 11a, 12a, 13a, 14a, 15a, 16a, 17a, 18a, and 19a from left, is converted to binary, it becomes "101001010" at the time t1, and "001010100" at the time t2. As described above, in each of the pairs 11 to 19 of the LEDs, when one LED in a pair is turned on, the other LED in the pair is turned off. In order to control respective pairs 11 to 19 of the LEDs as described above, the blinking control unit 2 generates a bit row which is obtained by reversing a bit row of a portion of the control signals corresponding to the first light emitting mark row 1a, as a bit row of a portion of the control signals corresponding to the second light emitting mark row 1b. For example, at the time t1, "110101011" is generated as a bit row of a portion of the control signals corresponding to the LEDS 11b, 12b, 13b, 14b, 15b, 16b, 17b, 18b, and 19b. In addition, a bit row corresponding to one of the first light emitting mark row 1a and the second light emitting mark row 1b may be generated as a control signal in the blinking control unit 2, and the control signal of the other one of the first light emitting mark row 1a and the second light emitting mark row 1b may be generated by reversing the bit row of the control signal generated in the blinking control unit 2 in the driving circuit of the light emitting unit 1.

Figure 3:
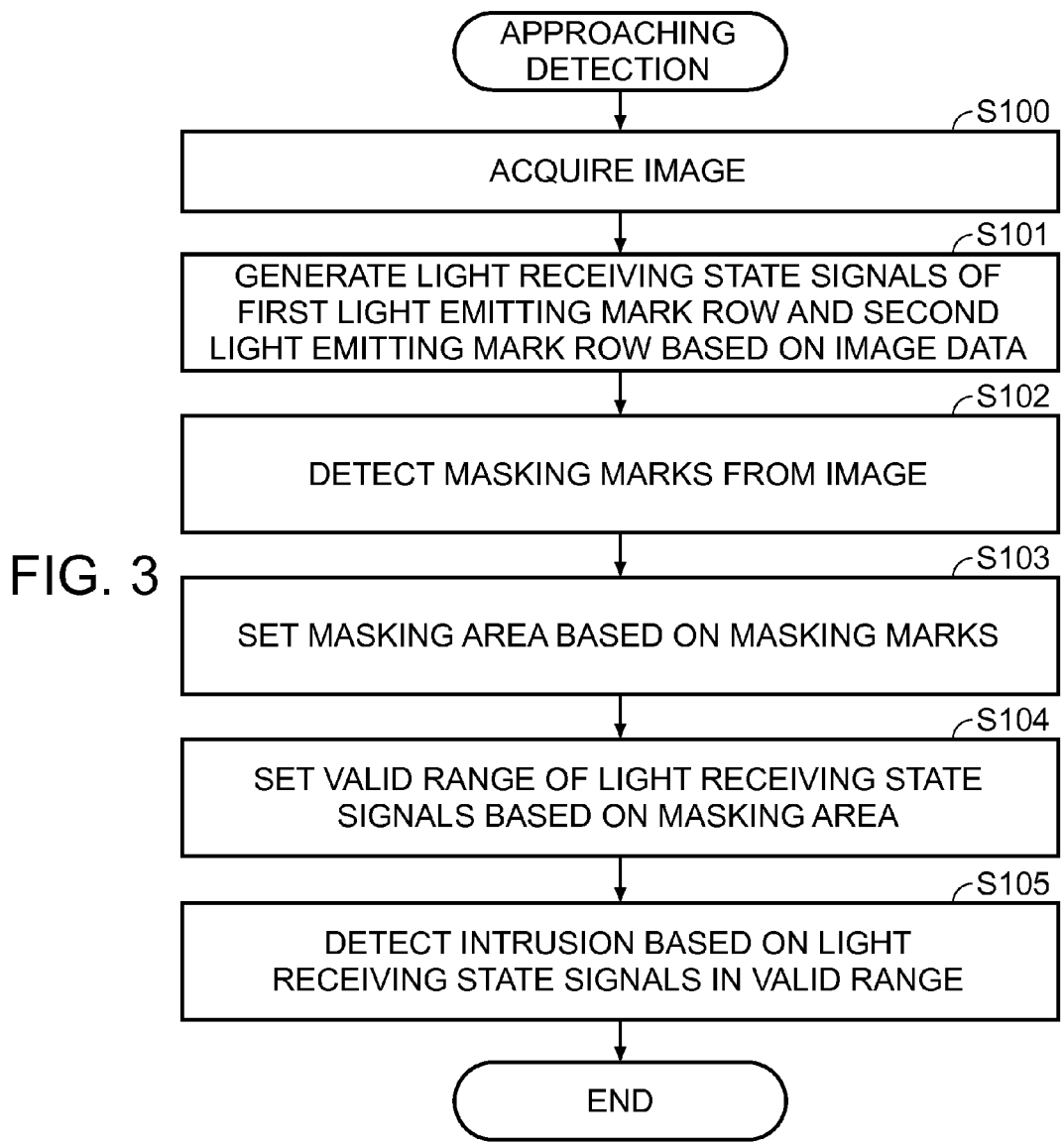
FIG. 3 is a flow chart according to the embodiment of the invention.

FIG. 3 is a flow chart showing a procedure of an intrusion detection method using the intrusion detection unit 7. FIG. 3 shows a procedure of a series of processes corresponding to an image of one frame configured by image data output from the digital camera 4. The detection unit 5 executes a process shown in FIG. 3 for each frame of the image data.

First, the detection unit 5 acquires image data of one frame from the digital camera 4 (S100). As described above, at the timing when the digital camera 4 images one frame of the light emitting unit 1, the blinking control unit 2 controls so that the light emitting states of the LEDs 11a, 12a, 13a, 14a, 15a, 16a, 17a, 18a, 19a, 11b, 12b, 13b, 14b, 15b, 16b, 17b, 18b, and 19b of the light emitting unit 1 are not switched.

Next, the detection unit 5 generates light receiving state signals of the first light emitting mark row 1a and the second light emitting mark row 1b based on the acquired image data (S101). The light receiving state signals are signals showing light receiving states of the digital camera 4 with respect to light emitted by the LEDs 11a, 12a, 13a, 14a, 15a, 16a, 17a, 18a, 19a, 11b, 12b, 13b, 14b, 15b, 16b, 17b, 18b, and 19b in a binary form for each LED.

Figure 4:
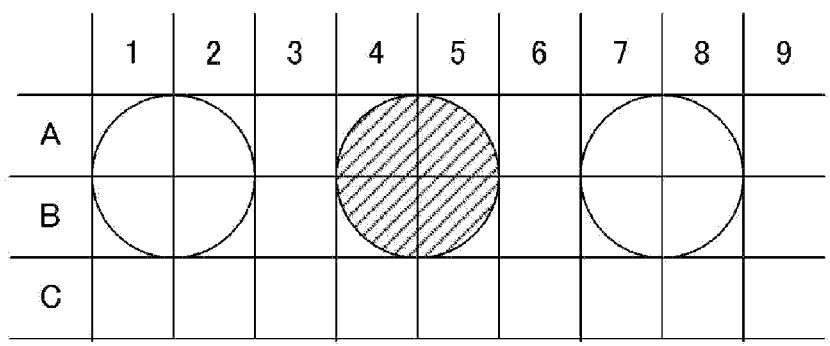
FIG. 4 is a schematic view according to the embodiment of the invention.

FIG. 4 is a schematic view showing the light receiving states of the digital camera 4 with respect to light emitted by the LEDs 11a, 12a, 13a, 14a, 15a, 16a, 17a, 18a, 19a, 11b, 12b, 13b, 14b, 15b, 16b, 17b, 18b, and 19b, and shows an image shown by a local area of the image data output from the digital camera 4. In FIG. 4, a white circle shows an image of the LED which is turned on, and a black circle (circle with hatching) shows an image of the LED which is turned off. In addition, numbers and letters in FIG. 4 are symbols showing positions of pixels.

When a positional relationship of the digital camera 4 and the light emitting unit 1 is fixed, an image of the LEDs 11a, 12a, 13a, 14a, 15a, 16a, 17a, 18a, 19a, 11b, 12b, 13b, 14b, 15b, 16b, 17b, 18b, and 19b is recorded in a predetermined area of the image data. Accordingly, by comparing a brightness value for each area corresponding to the image of the LEDs 11a, 12a, 13a, 14a, 15a, 16a, 17a, 18a, 19a, 11b, 12b, 13b, 14b, 15b, 16b, 17b, 18b, and 19b with a threshold value, the detection unit 5 can determine whether or not the corresponding LED is turned on or off. In detail, for example, the LED 11a which is turned on is set to correspond to pixels 1A, 1B, 2A, and 2B, and the LED 12a which is turned off is set to correspond to pixels 4A, 4B, 5A, and 5B. In this case, the total of the brightness values of pixels 1A, 1B, 2A, and 2B, is higher than the total of the brightness values of pixels 4A, 4B, 5A, and 5B. Accordingly, when the total of the brightness values of pixels 1A, 1B, 2A, and 2B is greater than the predetermined threshold value, the detection unit 5 determines that the LED 11a is turned on and in the reverse case, the detection unit determines that the LED 11a is turned off. In addition, more pixels may correspond to one LED, and fewer pixels may correspond to one LED. When it is determined that the LED is turned on, the detection unit 5 generates 1 as each bit of the light receiving state signal showing the light state of each LED, and when it is determined that the LED is turned off, the detection unit generates 0.

Figure 5A:
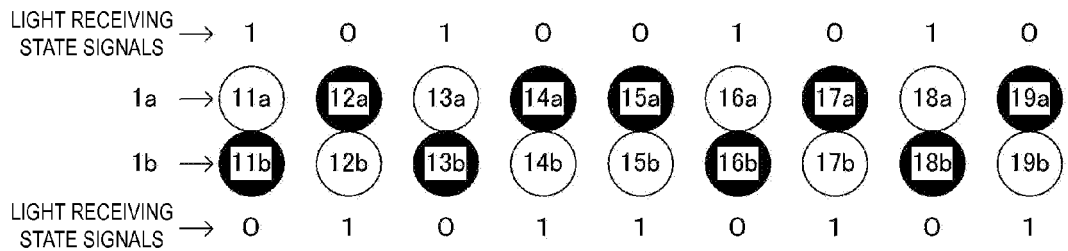
FIGS. 5A to 5C are schematic views according to the embodiment of the invention.
Figure 5B:
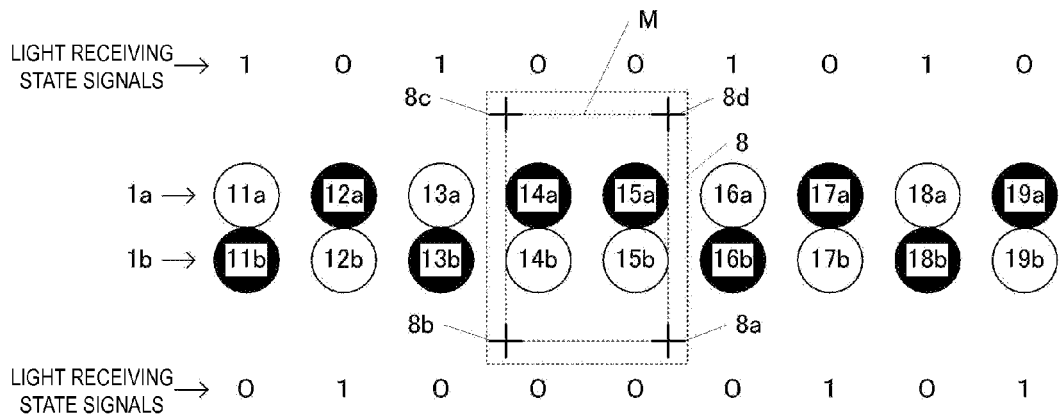

Herein, each LED is turned on as shown in FIG. 5A at the timing at which the light emitting unit 1 is imaged by the image data acquired by the detection unit 5. If a hindrance does not exist between the light emitting unit 1 and the digital camera 4, a portion of the light receiving state signal corresponding to the first light emitting mark row 1a becomes "101001010", and a portion thereof corresponding to the second light emitting mark row 1b becomes "010110101". On the other hand, as shown in FIG. 5B, when the tray 8 exists between the LEDs 14a, 14b, 15a, and 15b, and the digital camera 4, a portion of the light receiving state signal corresponding to the first light emitting mark row 1a becomes "101001010", and a portion thereof corresponding to the second light emitting mark row 1b becomes "010000101".

Next, the detection unit 5 detects masking marks 8a, 8b, 8c, and 8d from the image data acquired from the digital camera 4 (S102). Since the masking marks 8a, 8b, 8c, and 8d have predetermined optical characteristics, the detection unit 5 can detect the masking marks by well-known pattern matching or the like.

Then, the detection unit 5 sets a masking area based on the detected masking marks 8a, 8b, 8c, and 8d (S103). In detail, the detection unit 5 sets a rectangular area having a centroid of each of masking marks 8a, 8b, 8c, and 8d as apexes as a masking area. For example, as shown in FIG. 5B, when the tray 8 exists, a masking area M is set.

Then, the detection unit 5 sets a valid range of the light receiving state signals based on the masking area (S104). In detail, the bits of the light receiving state signals corresponding to the LEDs in the masking area are set to be invalid for each pair, and the bits of the light receiving state signals corresponding to the LEDs in the area other than the masking area are set to be valid. In the example, as will be described later, since the intrusion is detected by adding the light receiving state signals for each pair, even in a case where the masking area is overlapped with only one of the two LEDs which form a pair, 2 bits of the light receiving state signals corresponding to the two LEDs which form a pair are set to be invalid.

Figure 5C:
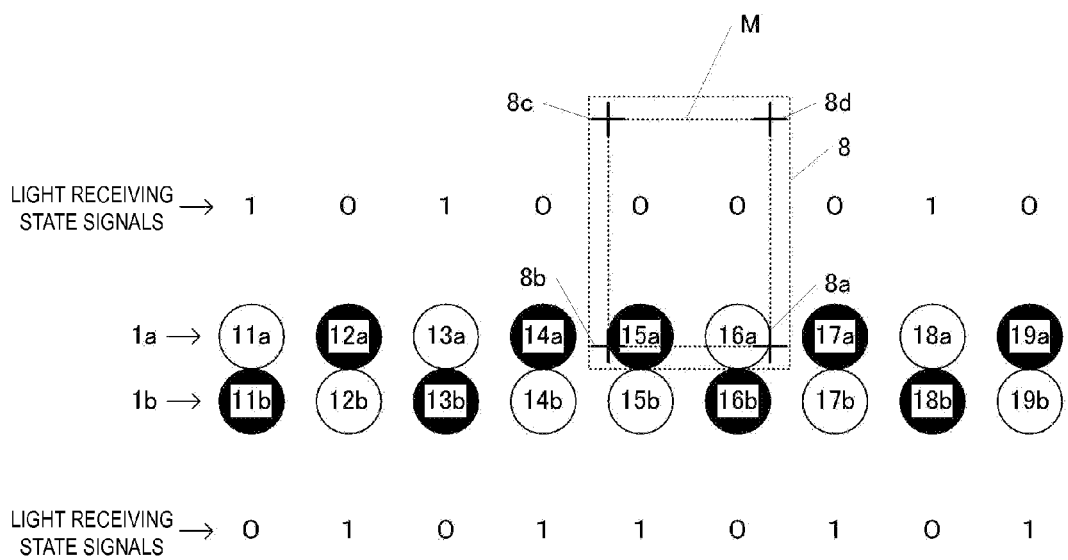

For example, as shown in FIG. 5B, when the tray 8 exists, the bits of the light receiving state signals corresponding to the pairs 11, 12, 13, 16, 17, 18, and 19 are set to be valid, and the bits of the light receiving state signals corresponding to the pairs 14 and 15 are set to be invalid. In addition, for example, as shown in FIG. 5C, when the tray 8 exists, the bits of the light receiving state signals corresponding to the pairs 11, 12, 13, 14, 17, 18, and 19 are set to be valid, and the bits of the light receiving state signals corresponding to the pairs 15 and 16 are set to be invalid.

Then, the detection unit 5 detects intrusion based on the light receiving state signals in the valid range (S105). In detail, the detection unit 5 adds the bits of the light receiving state signals in the valid range for each pair of the LEDs, and detects as "intrusion material detected", when the sum is not 1, and detects as "intrusion material not detected" when the sum is 1.

For example, as shown in FIG. 5A, when the LEDs of the light emitting unit 1 are turned on, and there is no hindrance between the light emitting unit 1 and the digital camera 4, the sum of the light receiving state signals of the pairs 11, 12, 13, 14, 15, 16, 17, 18, and 19 are respectively, set as "1+0" for the pair 11, "0+1" for the pair 12, "1+0" for the pair 13, "0+1" for the pair 14, "0+1" for the pair 15, "1+0" for the pair 16, "0+1" for the pair 17, "1+0" for the pair 18, and "0+1" for the pair 19. That is, in this case, all of the sum of the bits corresponding to each pair become "1", and the detection unit detects as "intrusion material not detected".

In addition, for example, as shown in FIG. 5B, when the tray 8 exists, since the sum of the light receiving state signals of the pairs 11, 12, 13, 14, 15, 16, 17, 18, and 19 are respectively, set as "1+0" for the pair 11, "0+1" for the pair 12, "1+0" for the pair 13, "0+0" for the pair 14, "0+0" for the pair 15, "1+0" for the pair 16, "0+1" for the pair 17, "1+0" for the pair 18, and "0+1" for the pair 19, the sum of bits corresponding to the pairs 14 and 15 becomes "0". If the masking marks 8a, 8b, 8c, and 8d are not attached to the tray 8, since the sum of the bits corresponding to the pairs 14 and 15 is not "1", the detection unit detects as "intrusion material detected". On the other hand, when the masking marks 8a, 8b, 8c, and 8d are attached to the tray 8, since the bits corresponding to the pairs 14 and 15 are invalidated by the masking area M, the detection unit detects as "intrusion material not detected".

In addition, although the bits corresponding to the pairs of the specific LEDs are invalidated by the masking area M, the bits of the light receiving state signals corresponding to the other LEDs are valid. Accordingly, when a foreign material exists between each LED of the light emitting unit 1 and the digital camera 4 in the external side of the masking area M, the detection unit 5 detects intrusion of the foreign material.

When detecting the intrusion of the foreign material, the detection unit 5 outputs predetermined signals to the robot controller 61. If the detection unit 5 detects as "intrusion material detected", the robot controller 61 executes the predetermined control processes, for example, stopping the arms 62 and 63, generating a warning sound, or blinking a warning lamp.

As easily understood from the description described above, the workers 9a and 9b can deliver a workpiece to the robot main body 6 without stopping the robot main body 6 or receiving a warning, by loading a workpiece on the tray 8 to which the masking marks 8a, 8b, 8c, and 8d are attached. In addition, by loading a workpiece on the tray 8 to which the masking marks 8a, 8b, 8c, and 8d are attached, by the robot main body 6, the workers 9a and 9b can receive the tray 8 and a workpiece from the robot main body 6 without stopping the robot main body 6 or receiving a warning.

That is, according to the example, by only attaching the predetermined masking marks 8a, 8b, 8c, and 8d to a moving body, it is possible to temporarily invalidate the detection of intrusion in the masking mark area having the masking marks 8a, 8b, 8c, and 8d as references. Accordingly, according to the example, it is possible to easily provide an exception to the warning or stopping with respect to intrusion to the intrusion monitoring area where the robot main body 6 is installed.

2. Other Embodiments

Hereinbefore, the invention has been described based on the embodiment, however, the technical scope of the invention is not limited to the embodiment described above, and various modifications or additions of the example described above can be performed in the invention.

Figure 6A:
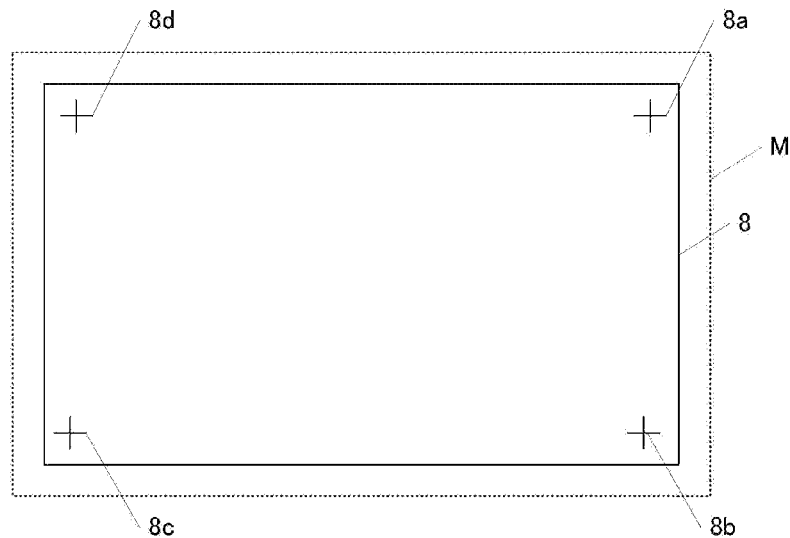
FIGS. 6A to 6C are plan views according to an embodiment of the invention.
Figure 6B:
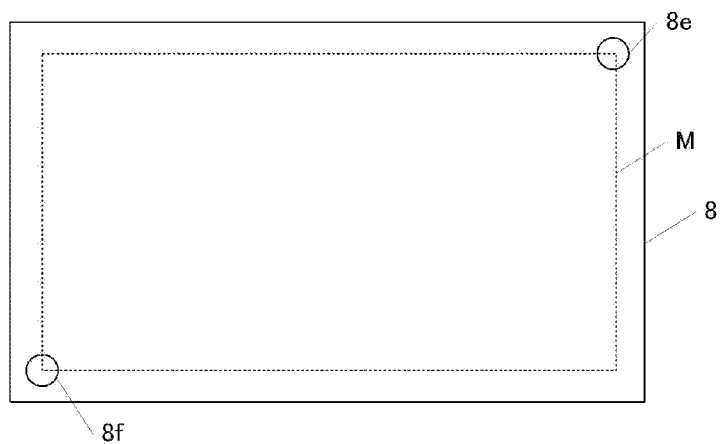
Figure 6C:
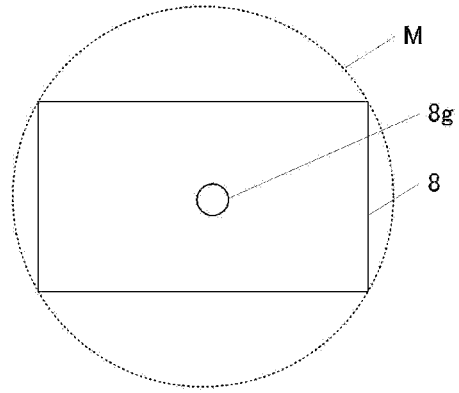
Figure 7A:
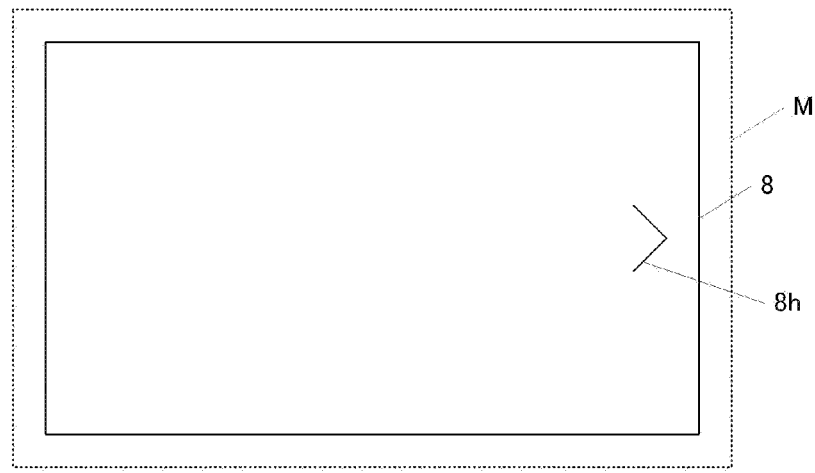
FIGS. 7A to 7C are plan views according to an embodiment of the invention.

For example, various modifications can be added to the method of setting the masking area based on the masking marks. In detail, as shown in FIG. 6A, the masking area M which provides a margin with respect to the rectangle having the four masking marks 8a, 8b, 8c, and 8d attached to the tray 8 as apexes, and includes the four masking marks 8a, 8b, 8c, and 8d may be set. In practice, as shown in FIG. 6A, the masking area M is preferable to be set wider than the tray 8. In addition, for example, as shown in FIG. 6B, the rectangular masking area M may be set based on the two masking marks 8e and 8f. Although there are two masking marks, if an angle formed by intersecting diagonal lines of the rectangular masking area is determined in advance, the predetermined rectangular masking area can be set based on the two masking marks. In addition, as shown in FIG. 6B, the masking marks may be isotropic figures such as circles. For example, as shown in FIG. 6C, a circular masking area M may be set based on one circular masking mark 8g. Although the masking mark 8g which is attached to the tray 8 is isotropic circle and there is only one masking mark, the predetermined isotropic masking area M can be set based on the masking mark 8g. In addition, for example, as shown in FIG. 7A, if a masking mark 8h is a figure which specifies the position and the direction as a single body, although there is only one masking mark 8h attached to the tray 8, the predetermined anisotropic masking area M can be set. That is, if the mark shape which sets the masking area can specify the position by the centroid, center, apexes, singularity of the marks, and can specify the direction by the anisotropic shape of the marks, only one mark may be attached to a moving body such as a tray.

Since the masking marks shown in FIGS. 6B, 6C, and 7A are not masking marks which primarily specify a masking area by itself, it is necessary to previously determine a relationship of the masking marks and the masking area. That is, it is necessary to attach the masking marks to the tray 8 according to the relationship between the predetermined masking marks and the masking area. Accordingly, in such a case, it is slightly difficult to suitably attach the masking mark to a moving body according to the shape of a workpiece or the moving body for loading a workpiece in the working site.

Figure 7B:
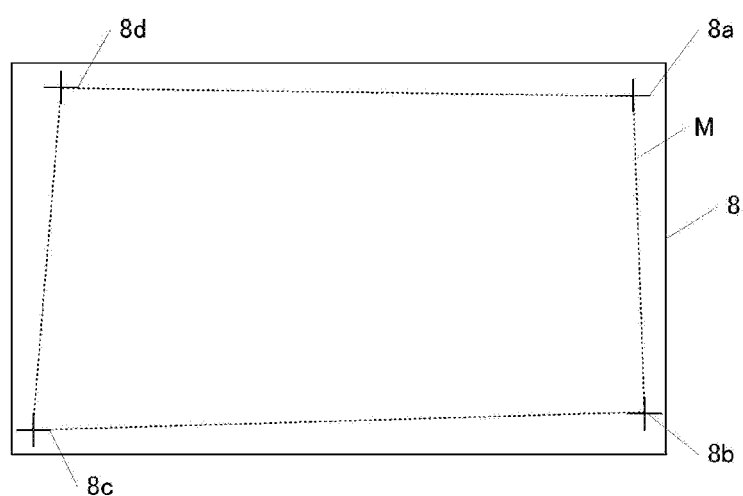
Figure 7C:
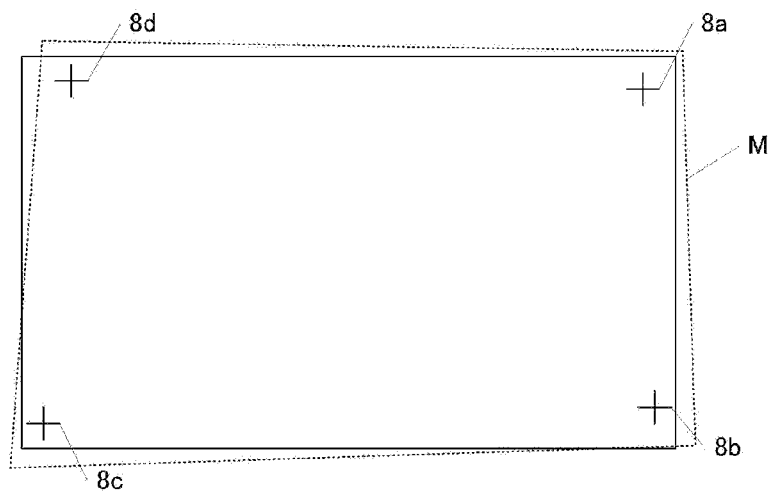

Meanwhile, in a case where arbitrary polygon having the masking marks 8a, 8b, 8c, and 8d as apexes is set as a masking area M as shown in FIG. 7B, and in a case where a margin is added with respect to the arbitrary polygon having the masking marks 8a, 8b, 8c, and 8d as apexes to set a masking area M as shown in FIG. 6A, it is easy to suitably attach the masking marks to a moving body according to the shape of a workpiece or the moving body for loading a workpiece in the working site.

In addition, as described above, basically the masking mark may not be in a form of specifying the points, and may be a linear shape corresponding to the outline of the masking area, for example. In detail, the masking mark may be set by attaching a predetermined colored tape along the outer periphery of the tray 8. In addition, the light source which emits light which can be discriminated from the light of the LED of the light emitting unit 1 may be set as a masking mark. Further, the light source or the like may be inserted in a moving body as a masking mark, a tape or seal may be attached to a moving body as a masking mark, and a moving body may be colored to draw a masking mark.

Figure 8:
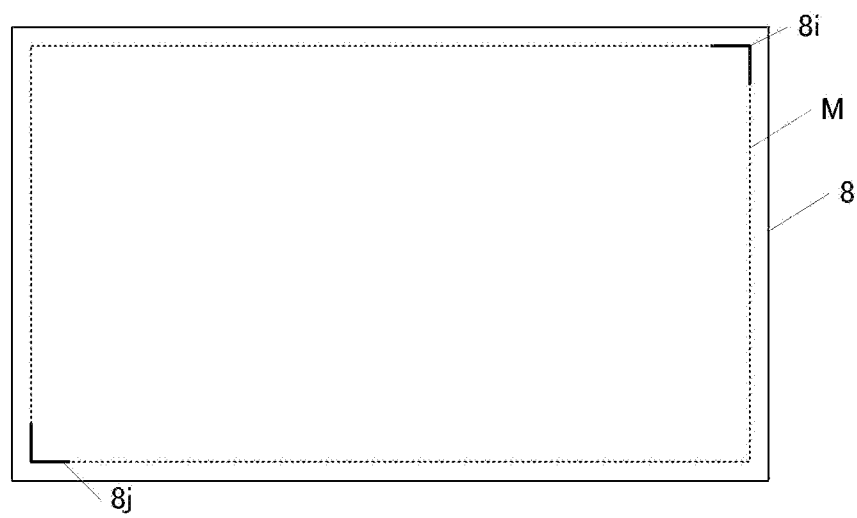
FIG. 8 is a plan view according to an embodiments of the invention.

In addition, for example, even with a masking mark specified with points, position information and direction information may be included in the masking mark. In detail, for example, as shown in FIG. 8, if the masking marks 8i and 8j are formed in an L-shape in which two line segments are perpendicular at the end point thereof, directions of four sides of the rectangular masking area can be specified only by two masking marks 8i and 8j. In this case, since it can be easily understood how the masking area is set from the masking marks, it is easy to suitably attach the masking marks to a moving body according to the shape of a workpiece or the moving body for loading a workpiece in the working site.

In addition, for example, the masking area can be set in any forms. That is, since the masking area is only necessary to be set by matching to the shape of a target material which is permitted to intrude in the intrusion monitoring area, the masking area may be set to be a triangle or a pentagon according to the plan shape of the tray or the wagon for loading a workpiece. In addition, as easily understood from the description described above, the optical characteristics of the masking marks and the relationship of the masking marks and the masking area may be previously determined, and it is not necessary to previously determine the masking area as it is. Accordingly, it is possible to freely set a masking area by masking marks, and it is not necessary to register the relationship between the masking marks and the masking area to the intrusion detection device 7 each time when attaching the masking marks.

In addition, a moving body which is permitted to intrude in the intrusion monitoring area is not limited to a tray or a wagon, and may be a box, may be an arm of a robot, or may be a workpiece as it is.

Figures 9A, 9B:
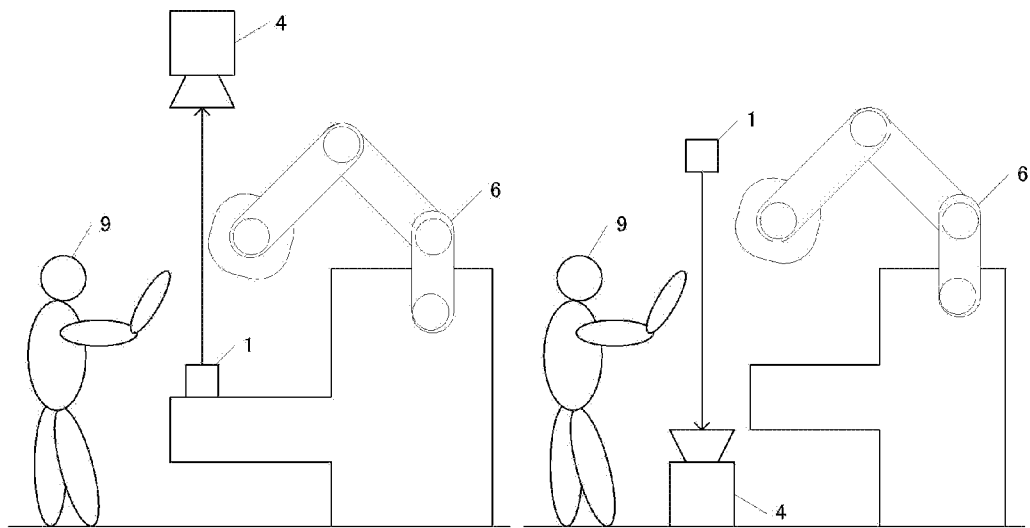
FIGS. 9A to 9D are schematic views according to an embodiment of the invention.
Figure 9C:
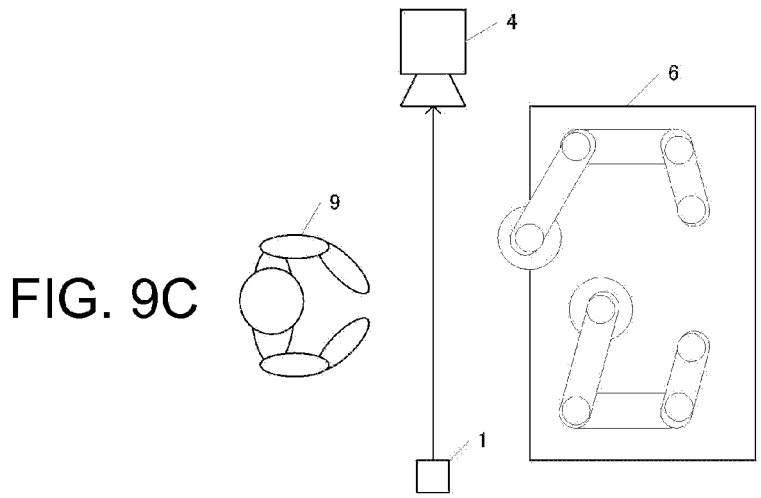
Figure 9D:
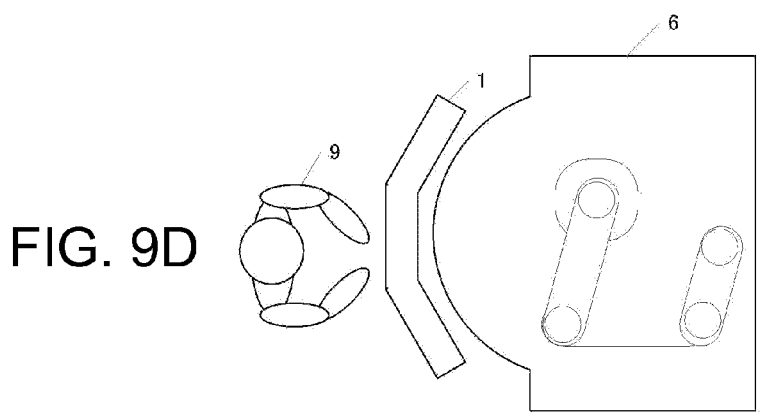

For example, as shown in FIGS. 9A and 9B, a light receiving surface of the digital camera 4 and a light receiving surface of the light emitting unit 1 may be set to face each other in a vertical direction, or as shown in FIG. 9C, a light receiving surface of the digital camera 4 and a light receiving surface of the light emitting unit 1 may be set to face each other in a horizontal direction. An area in which the masking marks are attached to a moving body can be set according to the direction in which the digital camera 4 and the light emitting unit 1 face each other. For example, as shown in FIG. 9C, in a case where the digital camera 4 and the light emitting unit 1 face each other in the horizontal direction, the masking marks can be attached to a side surface of a try or a wagon. In addition, for example, as shown in FIG. 9D, in a case where the boundary of the intrusion monitoring area of the robot main body 6 is configured with a curve, the light emitting marks such as the LEDs may be disposed along the curve in the light emitting surface of the light emitting unit 1.

As the light emitting marks, a light source such as a fluorescent tube, an electric lamp, or a laser, other than the LEDs, may be used, and a liquid crystal shutter which cuts off and releases a light path from a light source to an optical sensor may be used as a light emitting mark. In addition, a wavelength of a light source used in the light emitting mark may be any of ultraviolet light, visible light, or infrared light.

The entire disclosure of Japanese Patent Application No. 2012-122789, filed May 30, 2012 is expressly incorporated by reference herein.

What is claimed is:

1. An intrusion detection device that is configured to execute processes by a processor, the intrusion detection device comprising:
    a light emitting unit which forms a plurality of light emitting marks arranged on a boundary area between a safety area and an intrusion monitoring area;
    an imaging device configured to take an image of the boundary area including the plurality of light emitting marks, the imaging device configured to output the image in first through fourth states, wherein
        the first state corresponds to a reference image of the boundary area where no object exists,
        the second state corresponds to an intrusion image of the boundary area where a first object exists, the first object having no exception mark,
        the third state corresponds to an exceptional intrusion image of the boundary area where a second object exists, the second object having the exception mark, and
        the fourth state corresponds to a mixed image of the boundary area where the first and second objects exist; and
    a detector configured to detect the exception mark within the image in the third and fourth states, the detector configured to set a masking area corresponding to a shape of the second object existing in the boundary area based on a location of the exception mark, wherein
    the detector is configured to detect whether the first object is located outside the masking area in the fourth state, and
    the detector is configured to detect whether the first object is located in any part of the boundary area in the second state.

2. The intrusion detection device according to claim 1, wherein
    the second object is a moving body which is permitted to intrude into the intrusion monitoring area.

3. The intrusion detection device according to claim 1, wherein the exception mark has information corresponding to a location and a direction of the second object.

4. The intrusion detection device according to claim 1, wherein the detector is configured to detect the exception mark and the plurality of light emitting marks from the image, and the detector is configured to detect the first object based on the plurality of light emitting marks that are located outside the masking area.

5. A robot system that is configured to execute processes by a processor, the robot system comprising:
    movable components which manipulate a workpiece;
    a light emitting unit which forms a plurality of light emitting marks arranged on a boundary area between a safety area and an intrusion monitoring area, the movable components being located in the intrusion monitoring area;
    an imaging device configured to take an image of the boundary area including the plurality of light emitting marks, the imaging device configured to output the image in first through fourth states, wherein
        the first state corresponds to a reference image of the boundary area where no object exists,
        the second state corresponds to an intrusion image of the boundary area where a first object exists, the first object having no exception mark,
        the third state corresponds to an exceptional intrusion image of the boundary area where a second object exists, the second object having the exception mark, and
        the fourth state corresponds to mixed image of the boundary area where the first and second objects exist; and
    a detector configured to detect the exception mark within the image in the third and fourth states, the detector configured to set a masking area corresponding to a shape of the second object existing in the boundary area based on a location of the exception mark, wherein
    the detector is configured to detect whether the first object is located outside the masking area in the fourth state, and
    the detector is configured to detect whether the first object is located in any part of the boundary area in the second state.

6. The robot system according to claim 5, wherein
    the second object is a moving body which is permitted to intrude into the intrusion monitoring area.

7. A computer-implemented intrusion detection method for causing a processor to execute a process, the method comprising executing on the processor the steps of:
    acquiring an image by imaging a plurality of light emitting marks arranged on a boundary area between a safety area and an intrusion monitoring area with an imaging device, the image of the boundary area including first through fourth states, wherein
        the first state corresponds to a reference image of the boundary area where no object exists,
        the second state corresponds to an intrusion image of the boundary area where a first object exists, the first object having no exception mark,
        the third state corresponds to an exceptional intrusion image of the boundary area where a second object exists, the second object having the exception mark, and
        the fourth state corresponds to a mixed image of the boundary area where the first and second objects exist; and
    detecting the exception mark within the image in the third and fourth states, the detector configured to set a masking area corresponding to a shape of the second object existing in the boundary area based on a location of the exception mark, wherein
    the detector is configured to detect whether the first object is located outside the masking area in the fourth state, and
    the detector is configured to detect whether the first object is located in any part of the boundary area in the second state.

8. A non-transitory computer-readable medium for causing a computer to execute a process, comprising an instruction detection program thereon, that, when executed on a processor, causes the computer to function as:

an image acquiring unit which acquires an image by imaging a plurality of light emitting marks arranged on a boundary area between a safety area and an intrusion monitoring area with an imaging device, the image of the boundary area including first through fourth states, wherein
  the first state corresponds to a reference image of the boundary area where no object exists,
  the second state corresponds to an intrusion image of the boundary area where a first object exists, the first object having no exception mark,
  the third state corresponds to an exceptional intrusion image of the boundary area where a second object exists, the second object having the exception mark, and
  the fourth state corresponds to a mixed image of the boundary area where the first and second objects exist; and
detector configured to detect the exception mark within the image in the third and fourth states, the detector configured to set a masking area corresponding to a shape of the second object existing in the boundary area based on a location of the exception mark, wherein
the detector is configured to detect whether the first object is located outside the masking area in the fourth state, and
the detector is configured to detect whether the first object is located in any part of the boundary area in the second state.

* * * * *